(12) United States Patent
Shin et al.

(10) Patent No.: US 6,917,464 B2
(45) Date of Patent: Jul. 12, 2005

(54) UNPOLARIZED MULTI-LAMBDA SOURCE

(75) Inventors: Hong-Seok Shin, Suwon-shi (KR); Seong-Taek Hwang, Pyongtaek-shi (KR); Yun-Je Oh, Yongin-shi (KR)

(73) Assignee: Samsung Electronics Co., LTD, Suwon-si (KR)

( * ) Notice: Subject to any disclaimer, the term of this patent is extended or adjusted under 35 U.S.C. 154(b) by 0 days.

(21) Appl. No.: 10/441,445

(22) Filed: May 20, 2003

(65) Prior Publication Data

US 2004/0075889 A1 Apr. 22, 2004

(30) Foreign Application Priority Data

Oct. 18, 2002 (KR) ................................ 10-2002-0063795

(51) Int. Cl.$^7$ ................................................. H01S 3/00
(52) U.S. Cl. ..................... 359/333; 359/341.1; 359/347
(58) Field of Search ............................. 359/333, 341.1, 359/347; 372/6

(56) References Cited

U.S. PATENT DOCUMENTS 6,195,200 B1 * 2/2001 DeMarco et al. ...... 359/337.21
6,714,699 B1 * 3/2004 Cao et al. ...................... 385/17

* cited by examiner

*Primary Examiner*—Mark Hellner
(74) *Attorney, Agent, or Firm*—Cha & Reiter, L.L.C.

(57) ABSTRACT

Disclosed is a multi-lambda source for outputting an optical signal having a plurality of channels, the multi-lambda source comprising an optical fiber amplifier, having a back and front end, for amplifying an optical signal received from the back end and outputting ASE light to the back end, a reflector coupled to the back end of the optical fiber amplifier for reflecting a received optical signal, and a comb filter arranged between the optical fiber amplifier and the reflector and having a pass band of wavelengths for filtering the ASE light and generating the optical signal of the channels according to a transmission spectrum of the filtered ASE light.

10 Claims, 4 Drawing Sheets

UNPOLARIZED MULTI-LAMBDA SOURCE

CLAIM OF PRIORITY

This application claims priority to an application entitled "UNPOLARIZED MULTI-LAMBDA SOURCE," filed in the Korean Intellectual Property Office on Oct. 18, 2002 and assigned Serial No. 2002-63795, the contents of which are hereby incorporated by reference.

BACKGROUND OF THE INVENTION

1. Field of the Invention

The present invention relates to a Wavelength Division Multiplexing (WDM) optical transmission system. More particularly, to an optical source used for testing an optical component and an optical fiber-based optical source.

2. Description of the Related Art

As WDM optical transmission systems are developed that are capable of exponentially extending transmission bandwidth, a multi-lambda source is required to constitute an optical transmission network, as well as test an optical device and a system. In particular, to reduce costs required for constructing a subscriber network, the development of the multi-lambda source is an important problem to be solved.

The requirements of the multi-lambda source are as follows: (1) the multi-lambda source should provide the number of wavelengths corresponding to the number of wavelength bands to be used; (2) the multi-lambda source should output high power and provide uniform optical intensity according to a wavelength; (3) the multi-lambda source should provide a good Optical Signal to Noise Ratio (OSNR); and (4) polarization characteristics should be excluded where the multi-lambda source is used to test the WDM optical transmission system and its components.

Conventional multi-lambda source splits a wide spectrum of Amplified Spontaneous Emission (ASE) light generated by an Erbium Doped Fiber Amplifier (EDFA) into narrow spectrums using an optical filter. However, such a conventional multi-lambda source is not efficient, since much of the ASE light not corresponding to the optical filter wavelengths is consumed.

FIG. 1 is a view illustrating a configuration of a conventional multi-lambda source using an Arrayed Waveguide Grating (AWG). The multi-lambda source includes an ASE source 110, an optical isolator 120, an AWG 130, an EDFA 140 and an optical attenuator 150.

The ASE source 110 outputs ASE light having a wide spectrum. The optical isolator 120 passes the ASE light received from its back and cuts off light received from its front. The AWG 130 has a pass band of a number of wavelengths, and outputs an optical signal of a plurality of channels by filtering the ASE light. A channel configures an optical signal and includes light of a predetermined wavelength. The EDFA 140 amplifies the optical signal and then outputs the amplified optical signal. The optical attenuator 150 adjusts an intensity of the amplified optical signal by attenuating the amplified optical signal.

Disadvantageously, however, the conventional multi-lambda sources have limitations due to the line width of each wavelength constituting the pass band being wide in the AWG 130 and the intensity of a channel varying with the wavelength.

FIG. 2 is a view illustrating a configuration of a conventional multi-lambda source using FBGs (Fiber Bragg Gratings). The multi-lambda source includes an ASE source 210, an optical circulator 220 and a plurality of FBGs 230 arranged in series.

The ASE source 210 outputs ASE light having a wide spectrum, and the optical circulator 220 outputs the ASE light inputted through a first stage to a second stage. Light inputted into the second stage is outputted to a third stage. Each FBG 230 reflects only light having a predetermined wavelength (center wavelength) and then passes light of the remaining wavelength. Center wavelengths of the FBGs 230 constitute a reflection band, the light reflected from the FBGs 230, i.e., channels, constitutes the optical signal, and the optical signal is inputted into the second stage of the optical circulator 220.

The conventional multi-lambda source as described above has a number of limitations, for example, significant costs are incurred and insertion loss is increased because such a source should have the predetermined number of FBGs arranged in series to constitute a desired reflection band. Further, efficiency of such a source is deteriorated due to much of the ASE light not included in the reflection band is consumed.

SUMMARY OF THE INVENTION

In accordance with the principles of the present invention an unpolarized multi-lambda source is achieved having increased performance and efficiency and reduces or overcome many of the limitations of conventional multi-lambda sources.

In accordance with one illustrative embodiment of the present invention, a multi-lambda source is provided for outputting an optical signal including a plurality of channels having different wavelengths, the multi-lambda source comprising: an optical fiber amplifier, having a back and front end, for amplifying an optical signal received from the back end, using stimulated emission of a rare earth element and outputting ASE light to the back end; a reflector coupled to the back end of the optical fiber amplifier for reflecting a received optical signal; and a comb filter coupled between the optical fiber amplifier and the reflector and having a pass band of wavelengths for filtering the ASE light and generating the optical signal of the channels according to a transmission spectrum of the filtered ASE light.

BRIEF DESCRIPTION OF THE DRAWINGS

The features and other advantages of the present invention will be more clearly understood from the following detailed description taken in conjunction with the accompanying drawings, in which.

DETAILED DESCRIPTION OF THE PREFERRED EMBODIMENTS

Figure 1:
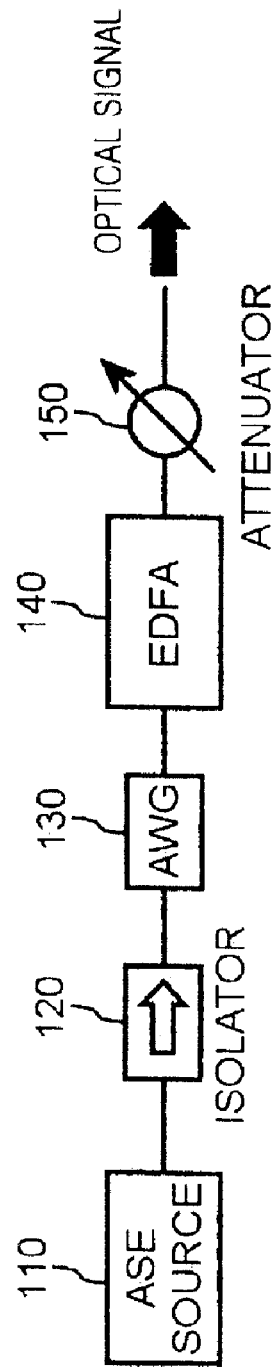
FIG. 1 depicts a conventional multi-lambda source using an AWG (Arrayed Waveguide Grating)
Figure 2:
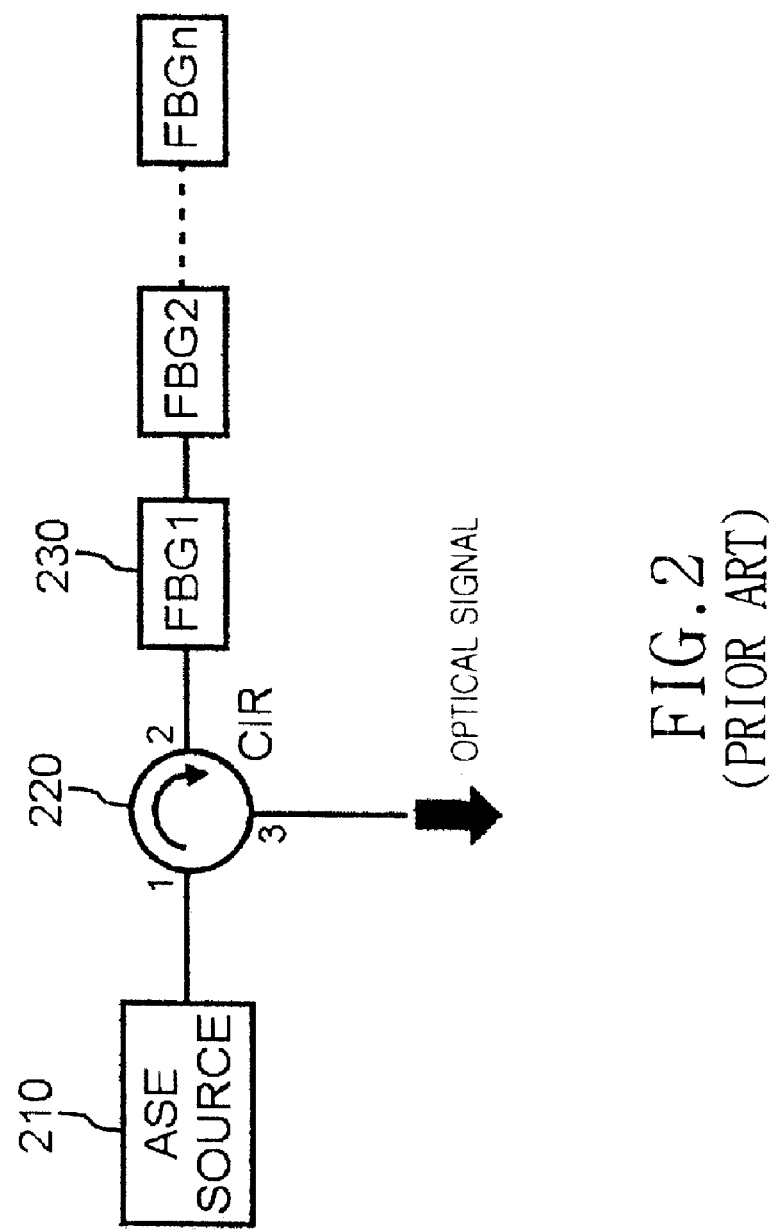
FIG. 2 is a view illustrating a configuration of a conventional multi-lambda source using FBGs (Fiber Bragg Gratings)

In the following description of the present invention, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. Moreover, it will be recognized that certain aspects of the figures are simplified for explanation purposes and that the full system environment for the invention will comprise many known functions and configurations all of which need not be shown here. In the drawings, the same or similar elements are denoted by the same reference numerals even though they are depicted in different drawings.

Figure 3:
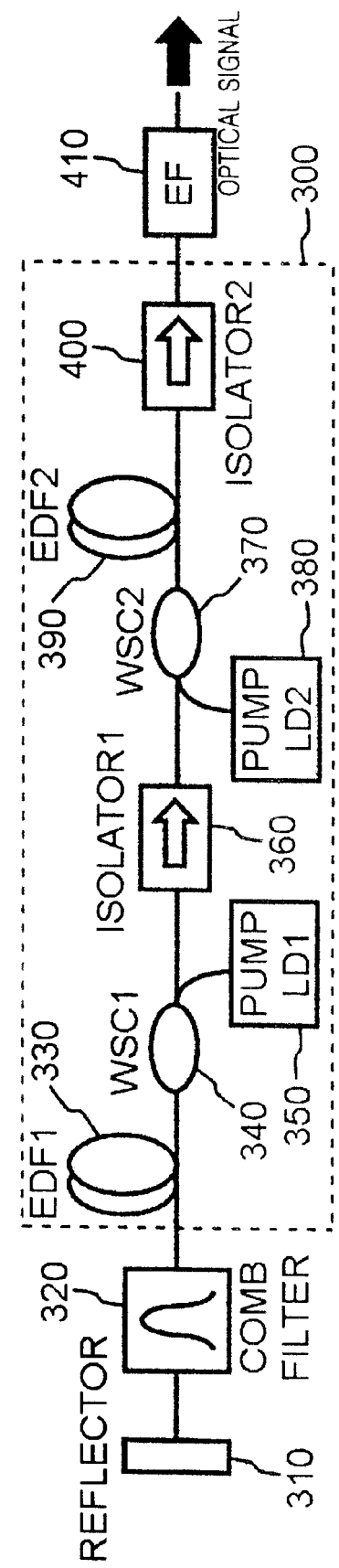
FIG. 3 depicts an illustrative embodiment of an unpolarized multi-lambda source in accordance with the principles of the present invention.

FIG. 3 depicts an illustrative embodiment of an unpolarized multi-lambda source in accordance with the principles of the present invention. The unpolarized multi-lambda source includes an optical fiber amplifier 300, a reflector 310, a comb filter 320 and an equalization filter 410. Hereinafter, components will be described according to a sequence of processing ASE light so that the present invention can be readily understood.

As described in further detail below, the optical fiber amplifier 300 amplifies an optical signal received/inputted from its back end and then outputs the amplified optical signal to its front end. In addition, optical fiber amplifier 300 outputs the ASE light to its back end.

The comb filter 320 is arranged between the optical fiber amplifier 300 and the reflector 310 and has a pass band made up of a number of wavelengths. The pass band represents a form of consecutively repeated Free Spectral Ranges (FSRs) and an FSR represents a basic unit of the pass band. The comb filter 320 can employ an etalon filter providing a transmission spectrum having minimized insertion loss in a certain wavelength cycle. The comb filter 320 generates an optical signal, which corresponds/includes channels according to the transmission spectrum, by filtering the ASE light inputted from the optical fiber amplifier 300.

The reflector 310 is arranged in the back of the comb filter 320 and reflects the optical signal received/inputted from the comb filter 320. The reflector 310 can employ an optical fiber grating for reflecting light of a predetermined wavelength band.

The comb filter 320 re-filters the optical signal received/inputted from the reflector 310. Thus, the optical signal outputted from the comb filter 320 is made up of channels having a narrower line width. Accordingly, the optical signal has an improved OSNR (Optical Signal to Noise Ratio).

The optical fiber amplifier 300 includes first and second amplifying fibers 330 and 390, first and second pumping sources 350 and 380, first and second wavelength selective couplers 340 and 370, and first and second optical isolators 360 and 400.

The first amplifying fiber 330 amplifies the optical signal received/inputted from the comb filter 320 and then outputs the amplified optical signal. The first and second amplifying fibers 330 and 390 can employ erbium-doped fibers.

The first pumping source 350 outputs pumping light of a predetermined wavelength for pumping the first amplifying fiber 330. The first and second pumping sources 350 and 380 can employ LDs (Laser Diodes).

The first wavelength selective coupler 340 couples the pumping light received/inputted from the first pumping source 350 to the first amplifying fiber 330, and passes the optical signal received/inputted from the first amplifying fiber 330. The first wavelength selective coupler 340 is arranged in the front of the first amplifying fiber 330. In this manner, the first amplifying fiber 330 is pumped to the back or in a reverse direction. Wavelength division multiplexing couplers can be employed as the first and second wavelength selective couplers 340 and 370.

As described above, because the pumping light outputted from the first pumping source 350 is used for primarily generating ASE light and secondarily amplifying the optical signal, it is understood that the multi-lambda source having better efficiency can be constructed without wasting an optical output.

The first optical isolator 360 is arranged in the front of the first wavelength selective coupler 340, passes the optical signal inputted from its back, and cuts off light inputted from its front.

The second amplifying fiber 390 amplifies the optical signal received/inputted through the first optical isolator 360 and then outputs the amplified optical signal.

The second pumping source 380 outputs pumping light of a predetermined wavelength for pumping the second amplifying fiber 390.

The second wavelength selective coupler 370 is arranged between the first optical isolator 360 and the second amplifying fiber 390. The pumping light received/inputted from the second pumping source 380 and the optical signal received/inputted from the first optical isolator 360 are coupled to the second amplifying fiber 390. The second wavelength selective coupler 370 is arranged in the back of the second amplifying fiber 390. Thus, the second amplifying fiber 390 is pumped to the front or in a forward direction.

The second optical isolator 400 is arranged in the front of the second amplifying fiber 390 and transmits the optical signal received/inputted from its back and cuts off light inputted from its front.

The equalization filter 410 is arranged in the front of the second optical isolator 400, and flattens a gain of the received/inputted optical signal. As the optical signal is amplified on the basis of a gain waveform of the first and second amplifying fibers 330 and 390, the outputs of respective channels are not uniform and the equalization filter 410 is used to equalize the outputs of the channels. The equalization filter 410 can employ a combination of long period fiber gratings having a Gaussian waveform loss function.

Importantly, because the optical signal is based on unpolarized ASE light in the multi-lambda source, a filtered and amplified optical signal has no polarized light.

Figure 4:
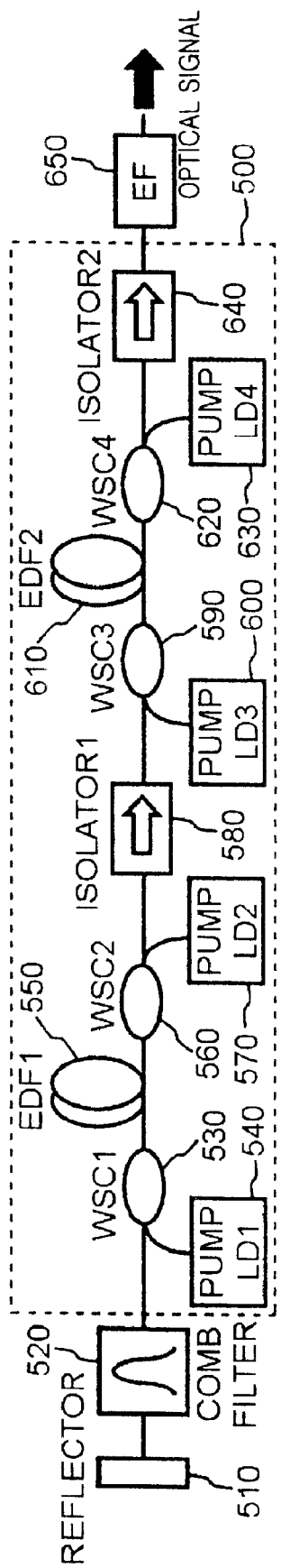
FIG. 4 depicts another illustrative embodiment of an unpolarized multi-lambda source in accordance with the principles of the present invention.

FIG. 4 depicts another illustrative embodiment of an unpolarized multi-lambda source in accordance with the principles of the present invention. The unpolarized multi-lambda source includes an optical fiber amplifier 500, a reflector 510, a comb filter 520 and an equalization filter 650. The multi-lambda source shown in FIG. 4 is different from the multi-lambda source shown in FIG. 3 in that the multi-lambda source shown in FIG. 4 has a bi-directional pumping (i.e., forward and backward pumping) structure. Hereinafter, the optical fiber amplifier 500 will be briefly described to avoid a repetitious description.

The optical fiber amplifier 500 includes first and second amplifying fibers 550 and 610, first to fourth pumping sources 540, 570, 600 and 630, first to fourth wavelength selective couplers 530, 560, 590 and 620, and first and second optical isolators 580 and 640.

The first amplifying fiber 550 amplifies and outputs an optical signal received/inputted from the comb filter 520.

The first and second pumping sources 540 and 570 output pumping light of a predetermined wavelength to pump the first amplifying fiber 550.

The first wavelength selective coupler 530 couples the pumping light received/inputted from the first pumping source 540 and an optical signal received/inputted from the comb filter 520 to the first amplifying fiber 550. The first wavelength selective coupler 530 is arranged in the back of the first amplifying fiber 550, and hence the first amplifying fiber 550 is forwardly pumped.

The second wavelength selective coupler 560 couples the pumping light received/inputted from the second pumping source 570 to the first amplifying fiber 550 and passes an optical signal received/inputted from the first amplifying fiber 550. The second wavelength selective coupler 560 is arranged in the front of the first amplifying fiber 550 and hence the first amplifying fiber 550 is backwardly pumped.

The first optical isolator 580 is arranged in the front of the second wavelength selective coupler 560, and passes an optical signal inputted from its back and cuts off light received/inputted from its front.

The second amplifying fiber 610 amplifies the optical signal received/inputted through the first optical isolator 580 and then outputs the amplified optical signal.

The third and fourth pumping sources 600 and 630 output pumping light of a predetermined wavelength to pump the second amplifying fiber 610.

The third wavelength selective coupler 590 is arranged between the first optical isolator 580 and the second amplifying fiber 610, and couples pumping light received/inputted from the third pumping source 600 and an optical signal received/inputted from the first optical isolator 580 to the second amplifying fiber 610. The third wavelength selective coupler 590 is arranged in the back of the second amplifying fiber 610 and hence the second amplifying fiber 610 is forwardly pumped.

The fourth wavelength selective coupler 620 is arranged in the front of the second amplifying fiber 610, couples the pumping light received/inputted from the fourth pumping source 630 to the second amplifying fiber 610, and passes an optical signal received/inputted from the second amplifying fiber 610. The fourth wavelength selective coupler 620 is arranged in the front of the second amplifying fiber 610 and hence the second amplifying fiber 610 is backwardly pumped.

The second optical isolator 640 is arranged in the front of the fourth wavelength selective coupler 620, transmits an optical signal received/inputted from the back, and cuts off light inputted from its front.

As apparent from the above description, the present invention enables an unpolarized multi-lambda source, based on ASE light with no polarized light to filter the ASE light, and outputs an amplified optical signal. Advantageously, the unpolarized multi-lambda source operates more stably than conventional multi-lambda sources and has higher power. Further, the unpolarized multi-lambda source enables optical device measurement and system measurement to be conveniently performed. Since the unpolarized multi-lambda source can be employed as an optical source when a subscriber network is constructed, an efficient and cost-effective transmission system can be made and a new transmission structure can be readily designed.

Although the preferred embodiments of the present invention have been disclosed for illustrative purposes, those skilled in the art will appreciate that various modifications, additions and substitutions are possible, without departing from the scope of the invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A multi-lambda source for outputting an optical signal having a plurality of channels, comprising:

an optical fiber amplifier, having a back and front end, for amplifying an optical signal received from the back end and outputting unpolarized ASE light to the back end;

a reflector coupled to the back end of the optical fiber amplifier for reflecting a received optical signal; and a comb filter arranged between the optical fiber amplifier and the reflector and having a pass band of wavelengths for filtering the unpolarized ASE light and generating the optical signal of the channels according to a transmission spectrum of the filtered unpolarized ASE light.

2. A multi-lambda source for outputting an optical signal having a plurality of channels, comprising:

an optical fiber amplifier, having a back and front end, for amplifying an optical signal received from the back end and outputting ASE light to the back end;

a reflector coupled to the back end of the optical fiber amplifier for reflecting a received optical signal; and a comb filter arranged between the optical fiber amplifier and the reflector and having a pass band of wavelengths for filtering the ASE light and generating the optical signal of the channels according to a transmission spectrum of the filtered ASE light, wherein the optical fiber amplifier comprises:

a first amplifying fiber for amplifying the optical signal inputted from the comb filter and then outputting the amplified optical signal;

a first pumping source for outputting pumping light to pump the first amplifying fiber;

a first wavelength selective coupler for coupling the pumping light inputted from the first pumping source to the first amplifying fiber;

a first optical isolator arranged in the front of the first amplifying fiber for transmitting light inputted from its back and cutting off light inputted from its front;

a second amplifying fiber for amplifying an optical signal inputted through the first optical isolator and then outputting the amplified optical signal;

a second pumping source for outputting pumping light to pump the second amplifying fiber;

a second wavelength selective coupler for coupling the pumping light inputted from the second pumping source to the second amplifying fiber; and a second optical isolator arranged in the front of the second amplifying fiber for transmitting light inputted from its back and cutting off light inputted from its front.

3. The multi-lambda source according to claim 2, further comprising:

an equalization filter coupled to the front end of the optical fiber amplifier for adjusting a gain of a received optical signal.

4. The multi-lambda source according to claim 3, wherein the first wavelength selective coupler is arranged between the first amplifying fiber and the first optical isolator, and the second wavelength selective coupler is arranged between the first optical isolator and the second amplifying fiber.

5. The multi-lambda source according to claim 4, wherein the optical fiber amplifier further comprises:
- a third pumping source for outputting light for pumping the first amplifying fiber;
- a third wavelength selective coupler arranged between the comb filter and the first amplifying fiber for coupling the light inputted from the third pumping source to the first amplifying fiber;
- a fourth pumping source for outputting light for pumping the second amplifying fiber; and
- a fourth wavelength selective coupler arranged between the first optical isolator and the second amplifying fiber for coupling the light inputted from the fourth pumping source to the second amplifying fiber.

6. The multi-lambda source according to claim 4, wherein the comb filter includes an etalon filter.

7. The multi-lambda source according to claim 4, wherein the reflector includes an optical fiber grating for reflecting light of a predetermined wavelength band.

8. The multi-lambda source according to claim 4, wherein the optical fiber amplifier uses a stimulated emission of a rare earth element.

9. A multi-lambda source for outputting an optical signal having a plurality of channels, comprising:
- a reflector to reflecting a received optical signal; and
- a comb filter coupled to the reflector, wherein the comb filter is arranged to (1) filter ASE light and (2) generate a filtered optical signal; and
- an optical fiber amplifier having a back and front end, wherein the back end is coupled to the comb filter, and is arranged to (1) amplify an optical signal received from the back end and (2) output the amplified optical signal to the front end and (3) output ASE light to the back end;

wherein the optical fiber amplifier comprises:
- a first amplifying fiber for amplifying the optical signal inputted from the comb filter and then outputting the amplified optical signal;
- a first pumping source for outputting pumping light to pump the first amplifying fiber;
- a first wavelength selective coupler for coupling the pumping light inputted from the first pumping source to the first amplifying fiber;
- a first optical isolator arranged in the front of the first amplifying fiber for transmitting light inputted from its back and cutting off light inputted from its front;
- a second amplifying fiber for amplifying an optical signal inputted through the first optical isolator and then outputting the amplified optical signal;
- a second pumping source for outputting pumping light to pump the second amplifying fiber;
- a second wavelength selective coupler for coupling the pumping light inputted from the second pumping source to the second amplifying fiber; and
- a second optical isolator arranged in the front of the second amplifying fiber for transmitting light inputted from its back and cutting off light inputted from its front.

10. The multi-lambda source according to claim 1, further including an equalization filter coupled to the front end of the optical fiber amplifier for adjusting a gain of a received optical signal.

* * * * *